United States Patent
DeLozier et al.

(10) Patent No.: US 9,650,276 B2
(45) Date of Patent: May 16, 2017

(54) METHODS FOR ENHANCING THE DEWATERABILITY OF SLUDGE WITH—ALPHA-AMYLASE TREATMENT

(71) Applicant: NOVOZYMES NORTH AMERICA, INC., Franklinton, NC (US)

(72) Inventors: Gregory DeLozier, Raleigh, NC (US); Jason Holmes, Zebulon, NC (US)

(73) Assignee: NOVOZYMES NORTH AMERICA, INC., Franklinton, NC (US)

(*) Notice: Subject to any disclaimer, the term of this patent is extended or adjusted under 35 U.S.C. 154(b) by 0 days.

(21) Appl. No.: 14/293,626

(22) Filed: Jun. 2, 2014

(65) Prior Publication Data

US 2014/0263049 A1  Sep. 18, 2014

Related U.S. Application Data

(63) Continuation of application No. 13/648,457, filed on Oct. 10, 2012, now abandoned, which is a continuation of application No. 12/063,069, filed as application No. PCT/DK2006/034342 on Sep. 1, 2006, now abandoned.

(60) Provisional application No. 60/714,121, filed on Sep. 2, 2005.

(51) Int. Cl.

| C02F 9/00 | (2006.01) |
|---|---|
| C02F 11/14 | (2006.01) |
| C02F 103/28 | (2006.01) |
| D06M 16/00 | (2006.01) |
| C02F 11/12 | (2006.01) |
| C02F 3/34 | (2006.01) |

(52) U.S. Cl.
CPC ............ *C02F 11/12* (2013.01); *C02F 3/34* (2013.01); *C02F 3/342* (2013.01); *C02F 11/14* (2013.01); *C02F 9/00* (2013.01); *C02F 11/121* (2013.01); *C02F 2103/28* (2013.01); *C02F 2303/06* (2013.01)

(58) Field of Classification Search
CPC .......... C02F 11/14; C02F 11/121; C02F 9/00; C02F 3/342; C02F 11/12; C02F 3/34; C02F 2103/28; C02F 2303/06; C02F 1/302; C02F 1/5236; C02F 1/56; C02F 3/12; A63G 31/00
See application file for complete search history.

(56) References Cited

U.S. PATENT DOCUMENTS

| 3,928,631 | A | 12/1975 | Freeman et al. |
|---|---|---|---|
| 5,662,810 | A | 9/1997 | Willgohs |
| 6,431,370 | B1 | 8/2002 | Braunstein |
| 6,733,673 | B2 | 5/2004 | Sarkar |
| 2003/0014125 | A1 | 1/2003 | Yamauchi |
| 2003/0141256 | A1 | 7/2003 | Sarkar |
| 2004/0115779 | A1 | 6/2004 | Olsen |
| 2004/0234649 | A1 | 11/2004 | Lewis |
| 2005/0079270 | A1 | 4/2005 | Scheimann |

FOREIGN PATENT DOCUMENTS

| DE | 3713739 A1 | 11/1988 |
|---|---|---|
| DE | 10249081 A1 | 4/2004 |
| EP | 220647 A1 | 5/1987 |
| EP | 291665 A1 | 11/1988 |
| JP | 2002316184 A | 1/2002 |
| WO | 91/10723 A1 | 7/1991 |
| WO | 2004/078960 A1 | 9/2004 |

OTHER PUBLICATIONS

Karam, 1997, J Chem Tech Biotechnol 69, 141-153.

*Primary Examiner* — Debbie K Ware
(74) *Attorney, Agent, or Firm* — Elias Lambiris

(57) ABSTRACT

This disclosure relates to methods of enhancing sludge dewaterability by adding an alpha-amylase to the sludge prior to conventional conditioning and dewatering operations. A method of treating sludge is also disclosed including contacting sludge with an alpha-amylase and removing water from the sludge.

17 Claims, 7 Drawing Sheets

SEQUENCE LISTING

<160> NUMBER OF SEQ ID NOS: 1

<210> SEQ ID NO 1
<211> LENGTH: 487
<212> TYPE: PRT
<213> ORGANISM: Geobacillus Stearothermophilus

<400> SEQUENCE: 1

Ala Pro Phe Asn Gly Thr Met Met Gln Tyr Phe Glu Trp Tyr Leu Pro
1               5                   10                  15

Asp Asp Gly Thr Leu Trp Thr Lys Val Ala Asn Glu Ala Asn Asn Leu
            20                  25                  30

-continued

```
Ser Ser Leu Gly Ile Thr Ala Leu Trp Leu Pro Pro Ala Tyr Lys Gly
        35                  40                  45

Thr Ser Arg Ser Asp Val Gly Tyr Gly Val Tyr Asp Leu Tyr Asp Leu
 50                  55                  60

Gly Glu Phe Asn Gln Lys Gly Thr Val Arg Thr Lys Tyr Gly Thr Lys
 65                  70                  75                  80

Ala Gln Tyr Leu Gln Ala Ile Gln Ala Ala His Ala Ala Gly Met Gln
                 85                  90                  95

Val Tyr Ala Asp Val Val Phe Asp His Lys Gly Gly Ala Asp Gly Thr
                100                 105                 110

Glu Trp Val Asp Ala Val Glu Val Asn Pro Ser Asp Arg Asn Gln Glu
            115                 120                 125

Ile Ser Gly Thr Tyr Gln Ile Gln Ala Trp Thr Lys Phe Asp Phe Pro
130                 135                 140

Gly Arg Gly Asn Thr Tyr Ser Ser Phe Lys Trp Arg Trp Tyr His Phe
145                 150                 155                 160

Asp Gly Val Asp Trp Asp Glu Ser Arg Lys Leu Ser Arg Ile Tyr Lys
                165                 170                 175

Phe Arg Gly Ile Gly Lys Ala Trp Asp Trp Glu Val Asp Thr Glu Asn
                180                 185                 190

Gly Asn Tyr Asp Tyr Leu Met Tyr Ala Asp Leu Asp Met Asp His Pro
            195                 200                 205

Glu Val Val Thr Glu Leu Lys Asn Trp Gly Lys Trp Tyr Val Asn Thr
        210                 215                 220

Thr Asn Ile Asp Gly Phe Arg Leu Asp Ala Val Lys His Ile Lys Phe
225                 230                 235                 240

Ser Phe Phe Pro Asp Trp Leu Ser Tyr Val Arg Ser Gln Thr Gly Lys
                245                 250                 255

Pro Leu Phe Thr Val Gly Glu Tyr Trp Ser Tyr Asp Ile Asn Lys Leu
                260                 265                 270

His Asn Tyr Ile Thr Lys Thr Asn Gly Thr Met Ser Leu Phe Asp Ala
            275                 280                 285

Pro Leu His Asn Lys Phe Tyr Thr Ala Ser Lys Ser Gly Gly Ala Phe
        290                 295                 300

Asp Met Arg Thr Leu Met Thr Asn Thr Leu Met Lys Asp Gln Pro Thr
305                 310                 315                 320

Leu Ala Val Thr Phe Val Asp Asn His Asp Thr Glu Pro Gly Gln Ala
                325                 330                 335

Leu Gln Ser Trp Val Asp Pro Trp Phe Lys Pro Leu Ala Tyr Ala Phe
            340                 345                 350

Ile Leu Thr Arg Gln Glu Gly Tyr Pro Cys Val Phe Tyr Gly Asp Tyr
        355                 360                 365

Tyr Gly Ile Pro Gln Tyr Asn Ile Pro Ser Leu Lys Ser Lys Ile Asp
370                 375                 380

Pro Leu Leu Ile Ala Arg Arg Asp Tyr Ala Tyr Gly Thr Gln His Asp
385                 390                 395                 400

Tyr Leu Asp His Ser Asp Ile Ile Gly Trp Thr Arg Glu Gly Val Thr
                405                 410                 415

Glu Lys Pro Gly Ser Gly Leu Ala Ala Leu Ile Thr Asp Gly Pro Gly
            420                 425                 430

Gly Ser Lys Trp Met Tyr Val Gly Lys Gln His Ala Gly Lys Val Phe
        435                 440                 445
```

-continued

```
Tyr Asp Leu Thr Gly Asn Arg Ser Asp Thr Val Thr Ile Asn Ser Asp
    450                 455                 460

Gly Trp Gly Glu Phe Lys Val Asn Gly Gly Ser Val Ser Val Trp Val
465                 470                 475                 480

Pro Arg Lys Thr Thr Val Ser
                485
```

METHODS FOR ENHANCING THE DEWATERABILITY OF SLUDGE WITH—ALPHA-AMYLASE TREATMENT

CROSS-REFERENCE TO RELATED APPLICATIONS

This application is a continuation of U.S. application Ser. No. 13/648,457 filed Oct. 10, 2012, (now abandoned), which is a continuation of U.S. application Ser. No. 12/063,069 filed Feb. 22, 2008 (now abandoned) which is a 35 U.S.C. 371 national application of PCT/DK2006/034342 filed Sep. 1, 2006, which claims priority or the benefit under 35 U.S.C. 119 of U.S. provisional application No. 60/714,121 filed Sep. 2, 2005, the contents of which are fully incorporated herein by reference.

FIELD OF THE INVENTION

The present invention relates to methods for enhancing the dewaterability of residuals (i.e. sludge) generated by conventional wastewater treatment operations.

BACKGROUND OF THE INVENTION

Sludge, generated during the course of conventional wastewater treatment, is usually de-watered (i.e. concentrated) prior to disposal via incineration, land application, land filling, composting, etc. A basic dewatering scenario involves forming strong, shear-resistant sludge flocs through the addition of a conditioning agent (e.g. ferric sulphate) and/or a flocculating agent (e.g. polyelectrolyte) followed by mechanical solid/liquid separation across gravity belt thickeners, belt filter presses, or centrifuges. By dewatering sludge, the wastewater treatment plant (WWTP) enhances the amount of solids per volumetric unit of sludge (i.e. cake solids) that ultimately must be disposed of. The benefits of higher cake solids include: Reduced dewatered sludge volume (less sludge to be "managed" by the plant); Lower annual transportation costs (shipping the sludge to landfills or sites of land application); Less water to be evaporated before sludge can be incinerated (increasing the net energy value of the sludge when incineration is used for cogeneration purposes); A more concentrated feed to digesters; and Reduced volume of sludge to be landfilled or land applied.

The generic composition of sludge is generally about 90-99% water, the remaining portion being total solids, with actual cell mass (i.e. bacterial cells) representing approximately 10% of the total solids. The remaining 90% of the total solids consists of extracellular polymeric substance (EPS) which forms a hydrated matrix within which the bacterial cells are dispersed. Sludge dewaterability, regardless of the means used to generate the sludge, has been largely associated with the EPS fraction of the whole sludge. EPS is comprised of debris from cell lysis (e.g. nucleic acid, lipids/phospholipids, protein, etc.), actively secreted extracellular products (e.g. polysaccharides and proteins), products of extracellular, EPS-bound enzymatic activity (e.g. polysaccharides), adsorbed material from the wastewater (e.g. humic substances, multivalent cations). Due to this complex nature of EPS and the predominant presence of polysaccharides and protein, EPS is traditionally characterized by the ratio of carbohydrates to proteins ($EPS_{carb:prot}$). While the $EPS_{carb:prot}$ can vary from primary sludge to primary sludge depending on numerous operational parameters of the WWTP, the EPS composition within secondary sludges is somewhat more digestion specific: Anaerobically digested sludge $EPS_{carb:prot}$ tends to be less than unity while aerobically digested sludge $EPS_{carb:prot}$ is greater than unity. In any case, these primary components are considered to be the key hydratable substances within sludge flocs that effectively bind water and resist dewatering.

Methods which disrupt the water-binding capacity and/or mechanical integrity of sludge flocs are believed to enhance the dewaterability of the whole sludge upon polymeric flocculation. Most of such methods have focused on the ability of novel chemistries (e.g. acid pre-treatment, multivalent cationic conditioners) and processes (high temperature pre-treatment, electric discharge, sonication) to disrupt EPS components and improve dewaterability. A number of papers exist describing the use of enzymes for selective hydrolysis within the EPS to reduce the sludge volume, with varying results. See DE10249081, U.S. 2003014125, WO9110723, and DE3713739.

SUMMARY OF THE INVENTION

The present invention relates to methods for enhancing the dewaterability of sludge comprising treating the sludge with an enzyme composition comprising an alpha-amylase. In a preferred embodiment, the invention relates to methods for enhancing the dewaterability of sludge comprising treating the sludge with an enzyme composition comprising a *Geobacillus stearothermophilus* alpha-amylase.

In yet another embodiment, the treatment comprises an enzyme composition comprising an alpha-amylase and at least one additional enzyme, such as, a protease, a lipase, a cellulase, a hemicellulase, an oxidoreductase a laccase, a glycosyl hydrolase and/or an esterase.

The enzyme treatment is preferably added prior to sludge conditioning (i.e., prior to coagulation and/or flocculation) and mechanical dewatering.

DETAILED DESCRIPTION OF THE INVENTION

Figure 1:
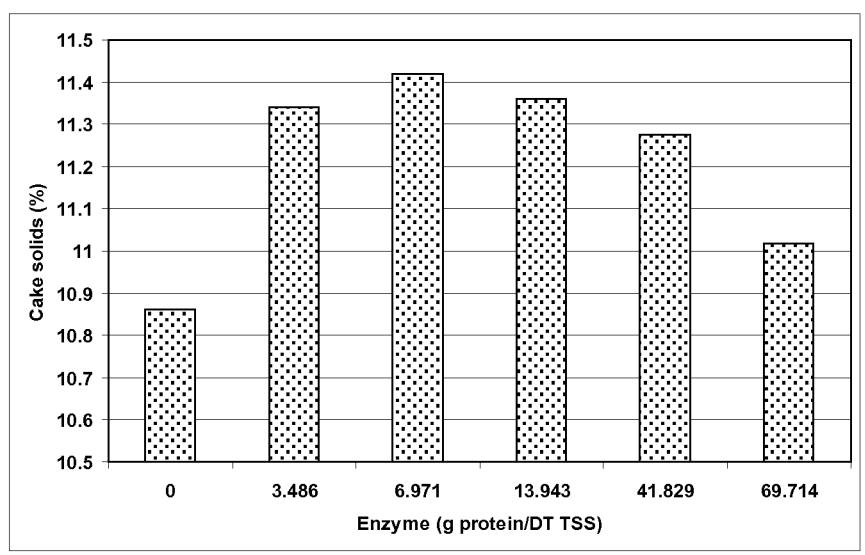
FIG. 1 shows dewatered cake solids as a function of increasing pre-treatment levels of *G. stearothermophilus* alpha-amylase.

The present invention relates to an enzymatic means to facilitate and/or improve the process of dewatering sludges, such as, sludges generated during conventional wastewater treatment.

The various processes to treat industrial and municipal wastewater often generate sludge as a by-product of proper operation. Sludges generated by the wastewater treatment industry are classified not only by the source of wastewater (i.e. municipal or industrial) but also by specific stages of the wastewater treatment process. In the broadest classification, sludge is considered primary, secondary or tertiary. Primary sludges are usually considered "raw" as they are often the result of settling of solids from raw wastewater influent passed across primary clarifiers. In most instances, the clarified water is then sent to activated sludge basins (ASBs) in which suspended flocs of microorganisms remove soluble contaminants from the water. As the microorganisms replicate, they must be periodically removed from the ASB to avoid overgrowth. Their removal takes place at a secondary clarifier receiving influent from the ASB. This "secondary sludge" is considered "waste activated sludge" (WAS) and has a relatively universal presence at WWTPs employing biological nutrient removal (BNR) systems. To reduce the volume of (and stabilize) this secondary sludge, the sludge may be sent to aerobic (ambient aeration or pure oxygen) or anaerobic digesters which may be operated under either mesophilic or thermophilic conditions. The resultant "tertiary" sludge is then known as "digested sludge" and may be further classified according to the specifics of digestion (e.g. thermophilic aerobically digested sludge). So, as can be seen, innumerable sludge types are produced during the treatment of wastewater. However, they can be loosely grouped as:

1. Primary or raw sludge;
2. Secondary or waste activated sludge; and
3. Tertiary, stabilized or digested sludge Regardless of the means by which it was generated, sludge produced during wastewater treatment operations, usually employing some means of biological nutrient removal, will contain substances that serve as substrates for enzymatic hydrolysis. In most instances, this substrate is present as a component of the extracellular polymeric substances (EPS) that comprise the majority of the sludge solids. The composition of EPS varies from sludge to sludge depending upon a number of variables including the nature of the wastewater to be treated, the treatment process employed and the treatment conditions. Specific monosaccharides (e.g. glucose, mannose, galactose, etc.) tend to be universally present within sludge EPS. Considering this, although the overall composition of the EPS of sludges may differ greatly, there is some degree of similarity in the type of glycosidic linkages present in the sludge components.

According to the present invention, alpha-amylase compositions described herein can be applied to all sludges associated with conventional wastewater treatment specifically to improve dewaterability. In a preferred embodiment, the alpha-amylase compositions are applied to primary and secondary sludges generated during treatment of industrial and municipal waste water. In another preferred embodiment, the alpha-amylase compositions are applied to primary sludge from primary clarifiers, waste activated sludge, return activated sludge, aerobically digested sludge and/or anaerobically digested sludge. A purpose of the present invention is to facilitate or improve the process of sludge dewatering comprising treating sludge with an alpha-amylase, preferably, prior to conventional sludge conditioning and dewatering operations.

The process to enhance the dewaterability of sludge according to the present invention comprises the following steps:
a) generating sludge, such as, during conventional wastewater treatment;
b) treating the sludge with an alpha-amylase enzyme composition;
c) optionally, conditioning the sludge with coagulating and/or flocculating additives;
d) dewatering the alpha-amylase treated sludge with conventional equipment.

In addition to above steps further optional steps may be include, such as, for example, treating the sludge with enzymes both before and after digestion/stabilization stages.

Examples of preferred alpha-amylases for use in the enzyme treatment are those derived from strains of *Geobacillus* (formerly *Bacillus*), e.g., *Geobacillus stearothermophilus*. As used herein, "derived from", as in, e.g., "derived from a *Geobacillus stearothermophilus*" means a wild-type alpha-amylase enzyme and variants thereof. Such enzymes can also be prepared synthetically, as is well-known in the art.

In a preferred embodiment, the alpha-amylase is derived from a strain of *Geobacillus stearothermophilus*. In a particularly preferred embodiment, the alpha-amylase is the commercial alpha-amylase enzyme composition AQUAZYM ULTRA™ (available from Novozymes North America, Inc.) Preferred alpha amylases are described in PCT application nos. WO 96/23873 and WO 99/19467. In another preferred embodiment, the enzyme composition comprises an alpha-amylase having at least 50% identity, at least 60% identity, at least 70% identity, at least 75% identity, at least 80% identity, at least 85% identity, at least 90% identity, at least 95% identity, at least 96% identity, at least 97% identity, at least 98% identity, or at least 99% identity to a *Geobacillus stearothermophilus* alpha-amylase as shown in SEQ ID NO:1. The degree of identity between two amino acid sequences can be determined by the Clustal method (Higgins, 1989, CABIOS 5: 151-153) using the LASERGENE™ MEGALIGN™ software (DNASTAR, Inc., Madison, Wis.) with an identity table and the following multiple alignment parameters: Gap penalty of 10 and gap length penalty of 10. Pairwise alignment parameters are Ktuple=1, gap penalty=3, windows=5, and diagonals=5.

The alpha-amylase is applied in amounts effective to facilitate or improve the process of sludge dewatering comprising treating sludge with an alpha-amylase, preferably, prior to conventional sludge conditioning and dewatering operations. Examples of suitable amounts include 2 to 140 g protein per kg of total suspended solids, 2 to 70 g of protein per kg of total suspended solids, 2 to 35 g of protein per kg of total suspended solids, more preferably 2 to 15 g of protein per kg of total suspended solids, 2-8 g of protein per kg of total suspended solids, and 2 to 5 g of protein per kg of total suspended solids.

The alpha-amylase may be applied under conditions suitable to the sludge processing conditions, such as, for example, temperatures from 5 to 40° C., pH conditions from 4 to10, and for a treatment time of 0.5 to 30 hours, such as, 1 min. to 24 hours, 30 min. to 12 hours, and 1 hour to 2 hours.

The alpha-amylase treatment may also involve the addition of one or more additional enzymes. Preferred additional enzymes include a protease, a lipase, a cellulase, a hemicellulase, an oxidoreductase a laccase, a glycosyl hydrolase and/or an esterase.

EXAMPLES

Example 1

*G. stearothermophilus* Alpha-Amylase Improves the Dewaterability of Industrial Waste Activated Sludge Procedure:
1. 400 ml of waste activated sludge, harvested from Novozymes North America's activated sludge basin, (1.4% TS, pH 7.2) were added to (6) 500 ml flasks.

2. The contents of each flask were then dosed with formulated *G. stearothermophilus* alpha-amylase (AQUAZYM ULTRA™) according to the schedule below:

| Trial # | Dose (g protein/DT TSS) | Sludge Vol (ml) | TSS(%) |
|---|---|---|---|
| 1 | 0 | 400 | 1.4 |
| 2 | 3.486 | 400 | 1.4 |
| 3 | 6.971 | 400 | 1.4 |
| 4 | 13.943 | 400 | 1.4 |
| 5 | 41.829 | 400 | 1.4 |
| 6 | 69.714 | 400 | 1.4 |

3. The flasks were then agitated, at room temperature, for 60 minutes using a rotary shaker (ensuring that the RPMs were sufficient to keep the sludge solids from forming zones of separation within the flask without over-shearing the sludge flocs by excessive agitation).
4. At the end of the incubation, the sludge contained within each flask was conditioned, dewatered and the degree of dewaterability determined according to the procedure below:
   a. The flask contents were transferred to a 500 ml plastic beaker.
   b. A 0.5% w/w dilution of polymer emulsion (Cytec CPAM), prepared at least 30 minutes prior to application, was added to the sludge to ensure a dose of 6.5 kg polymer/DT sludge solids.
   c. An impeller was used to slowly mix the sludge for 15 seconds (empirically determined to ensure adequate sludge flocculation).
   d. After flocculation (i.e. "conditioning"), the sludge was rapidly poured into the gravity drainage cup of the Crown Press (Phipps & Bird, Richmond, Va.) and allowed to drain for 60 seconds (The volume of filtrate collected during this gravity drainage is considered "free drainage" filtrate).
   e. The sludge cake was then transferred to the lower belt of the Crown Press (ideally, as one unit/sludge patty) and immediately pressed according to the pressure schedule below:

| Pressure (PSI) | 10 | 0 | 20 | 0 | 30 | 0 | 40 | 0 | 50 | 0 | 60 | 0 | 70 |
|---|---|---|---|---|---|---|---|---|---|---|---|---|---|
| Duration (seconds) | 30 | 10 | 15 | 10 | 15 | 10 | 10 | 10 | 10 | 10 | 10 | 10 | 10 | f. The % solids in the dewatered cake were determined according to Standard Methods for the Examination of Water and Wastewater 2540 B. "Total Solids Dried at 103-105° C.". TSS within the total filtrate recovered from gravity drainage and pressing was determined as well.
   g. These values were used to determine the overall volume of pressed sludge (presumed to represent a "per unit time" basis) via a mass balance (taking account for the additional volume in the feed due to polymer addition).

Figure 2:
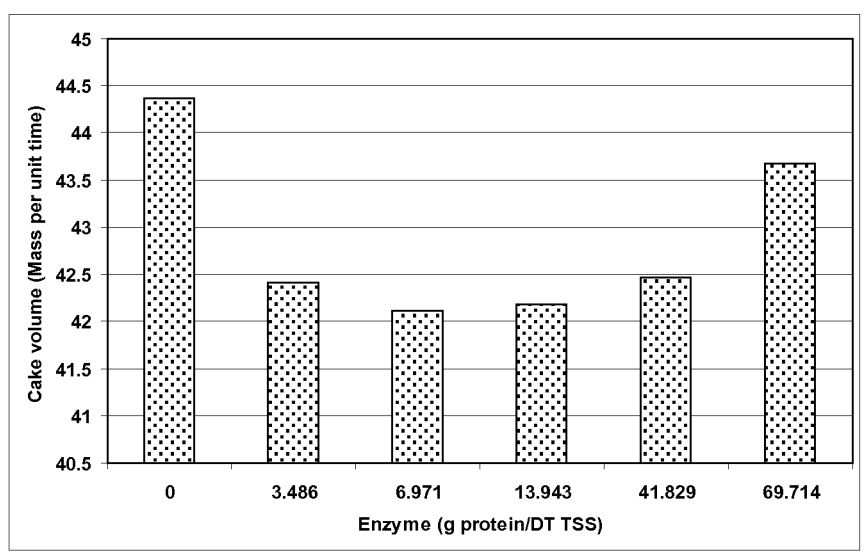
FIG. 2 shows dewatered cake volume generated per unit time as a function of dose of *G. stearothermophilus* alpha-amylase.

FIGS. 1 and 2 present the results of the trial which clearly show that small doses of *G. stearothermophilus* alpha-amylase can increase cake solids by up to 0.56% and simultaneously reduce dewatered cake volume by 3.34%. Considering that the total solids percentage of NZWAS is 1.4%, adding 0.5 kg of the formulated version of the enzyme per dry ton of solids equates to a dosage of ~7 ppm into the sludge feed. This means that the benefits can be realized with relatively low enzyme addition levels.

Example 2

Enhancing the Dewaterability of Municipal Primary Sludge.

Procedure:
1. 400 ml of primary sludge (3% TSS, pH 6.8), freshly harvested from a local municipal wastewater treatment plant were aliquoted into (2) 500 ml flasks.
2. The flasks were then dosed according to the schedule below:

| Trial # | Enzyme | Dose (g protein/DT TSS) | Sludge Vol (ml) | TSS (%) |
|---|---|---|---|---|
| 1 | Control | 0 | 400 | 3 |
| 2 | *G. stearothermophilus* α-amylase | 4.601 | 400 | 3 |

3. All flasks were the incubated, conditioned and dewatered according to the procedure described in example 1.

Figure 3:
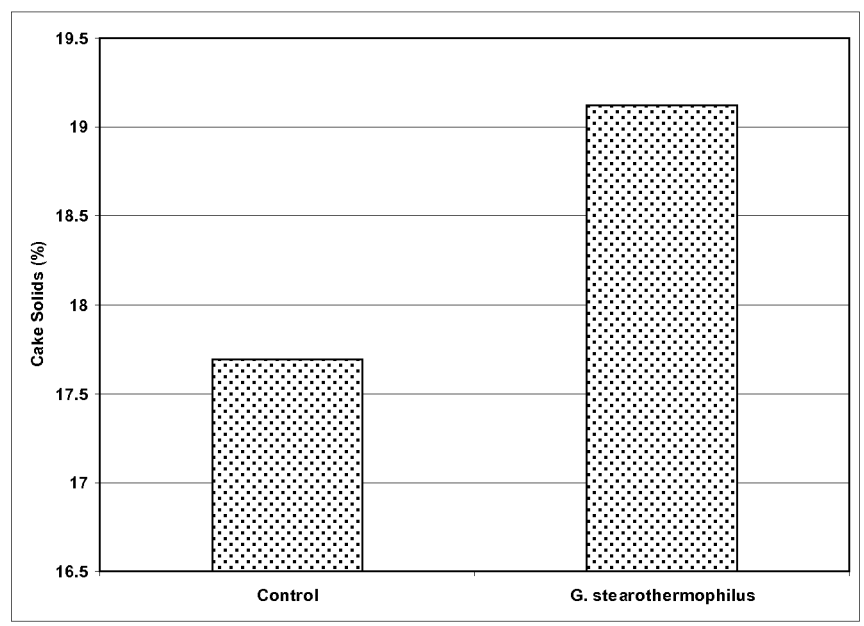
FIG. 3 shows dewatered cake solids as a function of enzymatic pre-treatment.
Figure 4:
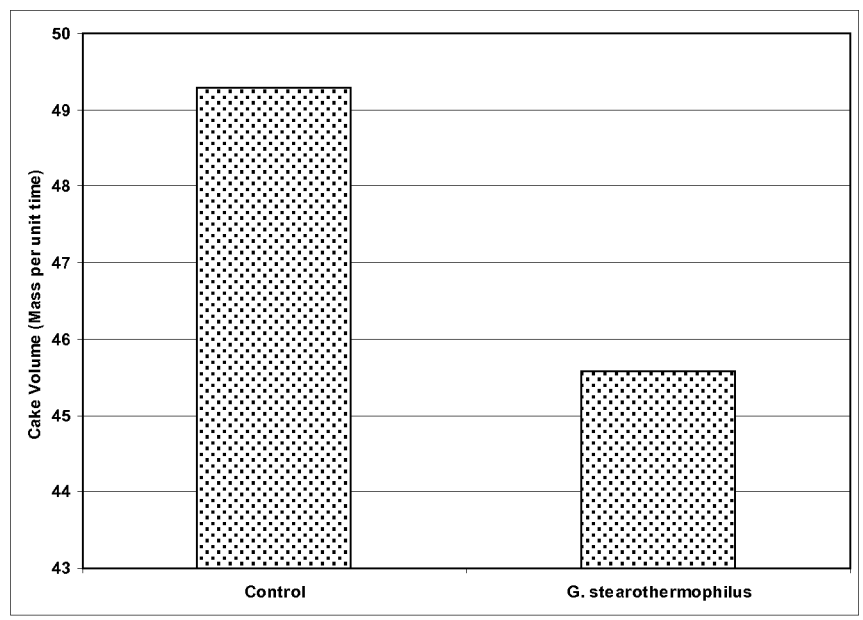
FIG. 4 shows dewatered cake volume as a function of enzymatic pre-treatment.

FIGS. 3 and 4 present the dewatered cake characteristics obtained from the enzymatically pre-treated primary sludge harvested from the local municipal wastewater treatment plant. Once again, after only 60 minutes of incubation, the *G. stearothermophilus* α-amylase pre-treatment is able to improve cake solids (~1.43% increase) and simultaneously reduce the volume of dewatered sludge (~7.5% reduction).

Example 3

Enhancing the Dewaterability of Municipal Waste Activated Sludge.

Procedure:
1. Freshly harvested return activated sludge, RAS, from a local wastewater treatment plant was allowed to settle under quiescent conditions for ~60 min.
2. The supernatant was decanted and the TSS determined for the settled sludge.
3. 400 ml of the settled return activated sludge (0.77% TSS, pH 6.5) were added to (6) 500 ml flasks.
4. The contents of each flask were then dosed according to the schedule below with an alpha-amylase or a maltogenic alpha-amylase (alpha-amylase A: a *G. stearothermophilus* alpha-amylase; alpha-amylase B: a *G. stearothermophilus* variant; alpha-amylase C: a maltogenic alpha-amylase; alpha-amylase D: STAINZYME available from Novozymes):

| Trial # | Enzyme | Dose (g protein/DT TSS) | Sludge Vol (ml) | TSS (%) |
|---|---|---|---|---|
| 1 | Control | 0 | 400 | 0.77 |
| 2 | *G. stearothermophilus* α-amylase A | 13.943 | 400 | 0.77 |
| 3 | α-amylase B (variant *G. stearothermophilus* α-amylase) | 13.943 | 400 | 0.77 |
| 4 | maltogenic alpha-amylase C | 13.943 | 400 | 0.77 |

| Trial # | Enzyme | Dose (g protein/ DT TSS) | Sludge Vol (ml) | TSS (%) |
|---|---|---|---|---|
| 5 | α-amylase D (STAINZYME) | 13.943 | 400 | 0.77 |
| 6 | Control | 0 | 400 | 0.77 |

5. All flasks were then incubated, conditioned and dewatered according to the procedure outlined in example 1.

Figure 5:
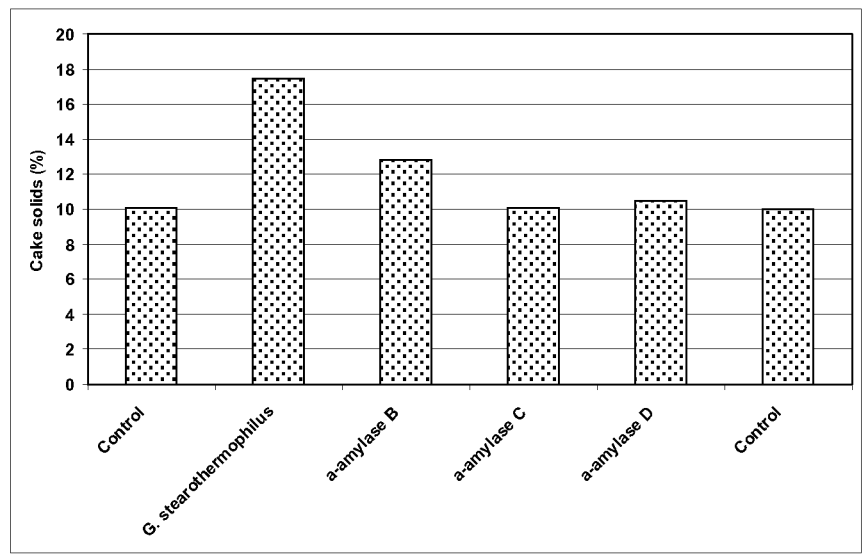
FIG. 5 shows dewatered cake solids as a function of enzymatic pre-treatment.
Figure 6:
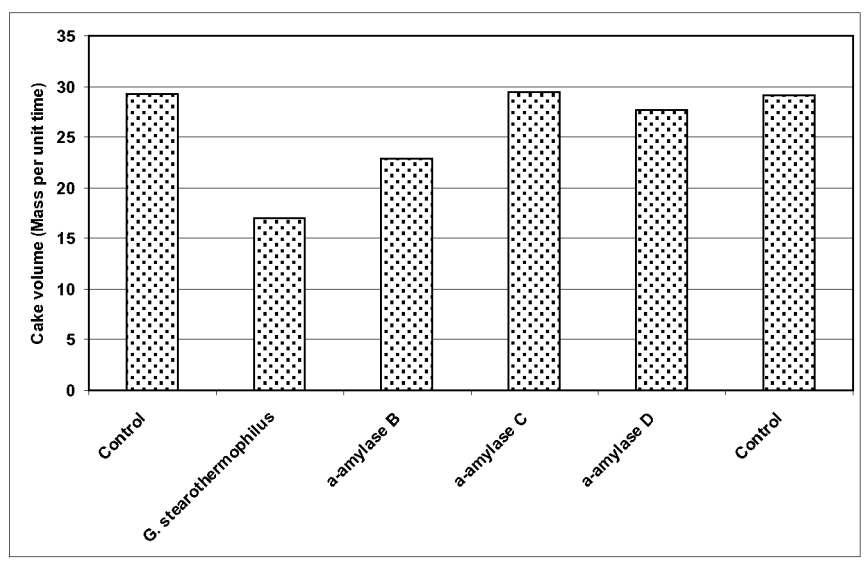
FIG. 6 shows dewatered cake volume as a function of enzymatic pre-treatment.
Figure 7:
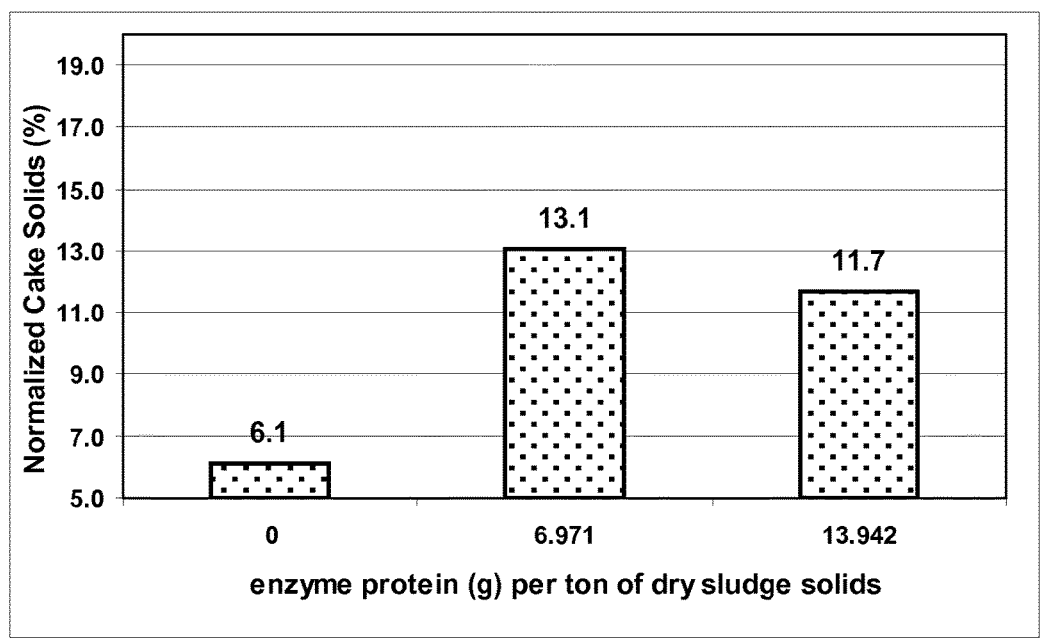
FIG. 7 shows dewatered cake solids as a function of enzymatic pre-treatment.

FIG. 5 presents the results obtained directly from the dewatered cake (i.e. cake solids) and FIG. 6 presents those obtained from a mass balance calculation (i.e. cake volume per unit time). The results clearly show that by pre-treating the thickened municipal WAS with 1 kg of *G. stearothermophilus* α-amylase per dry ton of sludge solids, the effect is quite dramatic. Cake solids were increased by more than 7% which, taken together with the percent solids within the pressate, yields a reduction in total cake volume that must ultimately be disposed, by over 40%. Interestingly, a variant of the *G. stearothermophilus* α-amylase was also found to improve the dewaterability of the WAS. However, the activity of the *G. stearothermophilus* alpha-amylase A is roughly two times that of the variant *G. stearothermophilus* alpha-amylase B.

Example 4

Enhancing the Dewaterability of Pulp and Paper-Mill Waste Activated Sludge.

Procedure:
1. 600 g of pulp mill biological sludge (obtained from wastewater treatment operations at a Swedish paper mill) was placed into (3) 1000 ml beakers.
2. While stirring all sludges with a stir bar on a stir plate, *G. stearothermophilus* alpha-amylase was dosed into each beaker according to the schedule below:

| Beaker # | Enzyme | Dose (g protein/ DT TSS) | TS (%) |
|---|---|---|---|
| 1 | *G. stearothermophilus* α-amylase A | 0 | 1.05 |
| 2 | *G. stearothermophilus* α-amylase A | 6.971 | 1.05 |
| 3 | *G. stearothermophilus* α-amylase A | 13.943 | 1.05 |

3. After 60 minutes of stirring, 500 ml of each sludge was conditioning with 9.71 kg of Fennopal K594 (Kemira, Sweden) per dry ton of sludge solids.
4. The flocculated sludge was immediately poured into a funnel fitted with a section of belt filter press cloth and allowed to freely drain for 5 minutes during which time the filtrate weight as a function of drainage time was recorded (Accomplished by capturing the filtrate within a tared 1 L graduated cylinder placed on a digital scale)
5. At the end of 5 minutes, a sample of the filtrate was collected to determine TS%
6. The resultant sludge cake was transferred to an aluminum weigh boat and homogenized (with a spatula) to ensure uniform moisture.
7. ~60 g of wet sludge was placed into a coffee filter and dewatered for 20 minutes within a custom-built device designed to simulate a belt filter press.
8. The weight of the remaining flocculated sludge within the weigh boat was recorded and then the boat was placed to dry overnight at 105° C. after which time the solids of the thickened sludge were determined.
9. After the 20 minutes of pressing, the dewatered sludge cakes were removed from both devices and used to determine the percentage of cake solids obtainable through either method.
10. To account for differences in the total amount of solids within the 60 g of wet sludge pressed within the custom belt-filter press simulator (a consequence of different degrees of water removal during the individual thickening stages), the cake solids calculated for each individual pressed sludge sample were multiplied by the percent solids obtained during its thickening and then the product was divided by the average of thickened solids obtained from all samples within the trial.

Upon mechanical dewatering via the belt filter press simulation, cake solids were improved by 7 percentage points, by pre-treating the sludge with 6.971 g *G. stearothermophilus* α-amylase per dry ton of total sludge solids over the untreated control. The improvement was slightly less when the enzyme dose was doubled (possibly due to excessive hydrolysis of the sludge flocs leading to loss of mechanical integrity and fragmentation).

The invention claimed is:

1. A method for enhancing the dewaterability of sludge comprising adding an alpha-amylase to the sludge, wherein the alpha-amylase has at least 95% sequence identity to the *Geobacillus stearothermophilus* alpha-amylase shown in SEQ ID NO: 1, and wherein the alpha-amylase is added in a dose in an amount of 2 to 140 g per dry ton of total suspended solids.

2. The method according to claim 1, wherein the alpha-amylase has at least 96% sequence identity to the alpha-amylase shown in SEQ ID NO: 1.

3. The method according to claim 1, wherein the alpha-amylase has at least 97% sequence identity to SEQ ID NO: 1.

4. The method according to claim 1, wherein the dose of alpha-amylase is between 2 and 70 g per dry ton of total suspended solids.

5. The method according to claim 1, wherein the dose of alpha-amylase is between 2 and 35 g per dry ton of total suspended solids.

6. The method according to claim 1, wherein the dose of alpha-amylase is between 2 and 8 g per dry ton of total suspended solids.

7. The method according to claim 1, wherein the dose of alpha-amylase is between 2 and 5 g per dry ton of total suspended solids.

8. The method according to claim 1, wherein the enzyme is allowed to incubate with the sludge for 1 minute to 24 hours.

9. The method according to claim 1, wherein the enzyme is allowed to incubate with the sludge for 30 minutes to 12 hours.

10. The method according to claim 1, wherein the enzyme is allowed to incubate with the sludge for 1 hour to 2 hours.

11. The method according to claim 1, wherein the sludge is generated during municipal and industrial wastewater treatment operations.

12. The method according to claim 1, wherein the sludge is selected from the group consisting of primary sludge from primary clarifiers, waste activated sludge, return activated sludge, anaerobically digested sludge and aerobically digested sludge.

13. The method according to claim 1, wherein the alpha-amylase is added in combination with one or more proteases, lipases, cellulases, hemicellulases, oxidoreductases, laccases, glycosyl hydrolases and/or an esterases.

14. A method of treating sludge comprising:
    (a) contacting sludge with a dose of alpha-amylase having at least 95% sequence identity to the alpha-amylase shown in SEQ ID NO: 1, wherein the dose is in an amount of 2 to 140 g per dry ton of total suspended solids; and
    (b) removing water from the sludge.

15. The method of claim 14, wherein the alpha-amylase having at least 98% sequence identity to the alpha-amylase shown in SEQ ID NO: 1.

16. The method of claim 14, wherein the alpha-amylase having at least 99% sequence identity to the alpha-amylase shown in SEQ ID NO: 1.

17. The method of claim 14, wherein the alpha-amylase consists of the amino acid sequence of SEQ ID NO: 1.

* * * * *